US011080096B1

(12) United States Patent
Fakhouri et al.

(10) Patent No.: US 11,080,096 B1
(45) Date of Patent: Aug. 3, 2021

(54) FRAMEWORK FOR MANAGING CLOUD COMPUTING PLATFORMS

(71) Applicant: Pivotal Software, Inc., San Francisco, CA (US)

(72) Inventors: Onsi Joe Fakhouri, Denver, CO (US); James Jacob Watters, San Francisco, CA (US)

(73) Assignee: Pivotal Software, Inc., San Francisco, CA (US)

( * ) Notice: Subject to any disclaimer, the term of this patent is extended or adjusted under 35 U.S.C. 154(b) by 57 days.

(21) Appl. No.: 16/226,247

(22) Filed: Dec. 19, 2018

Related U.S. Application Data

(60) Provisional application No. 62/608,544, filed on Dec. 20, 2017.

(51) Int. Cl.
*G06F 9/50* (2006.01)
*H04L 12/24* (2006.01)
(Continued)

(52) U.S. Cl.
CPC ........ *G06F 9/5072* (2013.01); *G06F 9/45558* (2013.01); *G06F 9/5077* (2013.01); *H04L 41/0293* (2013.01); *H04L 41/0806* (2013.01); *H04L 41/0893* (2013.01); *H04L 41/5051* (2013.01); *H04L 45/586* (2013.01); *H04L 49/70* (2013.01); *H04L 63/0263* (2013.01);
(Continued)

(58) Field of Classification Search
None
See application file for complete search history.

(56) References Cited

U.S. PATENT DOCUMENTS 8,997,078 B2 * 3/2015 Spivak ............... G06F 9/5055
717/168
9,071,522 B2 * 6/2015 Lucovsky ........... H04L 63/0245
(Continued)

OTHER PUBLICATIONS

Rodenas, Ferran. "Docker Service Broker for Cloud Foundry," posted at < https://tanzu.vmware.com/content/blog/docker-service-broker-for-cloud-foundry> on Aug. 22, 2014 (Year: 2014).*
(Continued)

*Primary Examiner* — Scott B Christensen
(74) *Attorney, Agent, or Firm* — Fish & Richardson P.C.

(57) ABSTRACT

Methods, systems, and apparatus, including computer programs encoded on computer storage media, for implementing an integrated cloud system that enables a user to integrate software tasks executing on different software platforms. A method includes maintaining, by an integrated cloud system, a first software platform and a different second software platform that are configured to communicate by a shared networking subsystem. The integrated cloud system receives a first request to deploy instance(s) of a first software task on the first software platform. The first platform deploys the instance(s) of the first software tasks. The integrated cloud system receives a request to deploy instance(s) of a second software task on the second software platform. The second platform deploys the instance(s) of the second software task. The integrated cloud system configures communications between the instance(s) of the first software task and the instance(s) of the second software task using the shared networking subsystem.

21 Claims, 3 Drawing Sheets

(51) Int. Cl.
*H04L 12/931* (2013.01)
*H04L 12/713* (2013.01)
*H04L 29/06* (2006.01)
*H04L 29/08* (2006.01)
*G06F 9/455* (2018.01)

(52) U.S. Cl.
CPC .............. *H04L 63/20* (2013.01); *H04L 67/16* (2013.01); *H04L 67/34* (2013.01); *G06F 2009/45583* (2013.01); *G06F 2009/45587* (2013.01)

(56) References Cited

U.S. PATENT DOCUMENTS

| | | | | |
|---|---|---|---|---|
| 9,274,758 | B1* | 3/2016 | Qin | G06F 8/60 |
| 2011/0265081 | A1* | 10/2011 | Lucovsky | G06F 8/60 717/177 |
| 2012/0072555 | A1* | 3/2012 | DeLuca | G06F 9/5077 709/220 |
| 2015/0120939 | A1* | 4/2015 | Islam | H04L 41/5045 709/226 |
| 2018/0048716 | A1* | 2/2018 | Madhayyan | G06F 9/45558 |
| 2018/0285165 | A1* | 10/2018 | Helsley | G06F 9/5077 |
| 2018/0324203 | A1* | 11/2018 | Estes | G06F 9/45558 |
| 2019/0065277 | A1* | 2/2019 | Raikov | H04L 41/5048 |
| 2019/0187865 | A1 | 6/2019 | Gresham et al. | |
| 2019/0188107 | A1 | 6/2019 | Alston et al. | |

OTHER PUBLICATIONS

U.S. Appl. No. 16/206,865, Alston et al., filed Nov. 30, 2018.
AppDynamics [online], "Application Performance Monitoring & Management," available on or before Oct. 16, 2018, via Internet Archive: Wayback Machine URL <https://web.archive.org/web/20181016153208/https://www.appdynamics.com/>, [retrieved on Nov. 14, 2018], retrieved from: URL <https://www.appdynamics.com/>, 4 pages.
DataDog [online], "Modern Monitoring & Analytics," available on or before Nov. 11, 2018, via Internet Archive: Wayback Machine URL <https://web.archive.org/web/20181111043724/https://www.datadoghq.com/> [retrieved on Nov. 14, 2018], retrieved from: URL <https://www.datadoghq.com/>, 3 pages.
New Relic [online], "Real-Time Insights for Modern Software," available on or before Nov. 1, 2018, via Internet Archive: Wayback Machine URL <https://web.archive.org/web/20181110010129/https://newrelic.com/>, [retrieved on Nov. 14, 2018], retrieved from: URL <https://newrelic.com/>, 6 pages.
Prometheus [online]. "From Metrics to Insight," available on or before Dec. 19, 2017, via Internet Archive: Wayback Machine URL <https://web.archive.org/web/20171219031415/https://prometheus.io/>, [retrieved on Nov. 14, 2018], retrieved from: URL <https://prometheus.io/>, 5 pages.

* cited by examiner

FRAMEWORK FOR MANAGING CLOUD COMPUTING PLATFORMS

CROSS REFERENCE TO RELATED APPLICATIONS

This application claims the benefit under 35 U.S.C. § 119(e) of the filing date of U.S. Patent Application No. 62/608,544, filed Dec. 20, 2017, entitled "FRAMEWORK FOR MANAGING CLOUD COMPUTING PLATFORMS," the entire contents of which are hereby incorporated by reference.

BACKGROUND

This specification generally relates to cloud computing platforms.

A cloud application platform is a platform-as-a-service ("PaaS") cloud computing system that allows users to deploy and manage multiple instances of network-accessible applications, which for brevity will also be referred to as simply applications or, when additional context is required, platform applications. The applications are executed by hardware of an underlying cloud computing infrastructure, which may or may not be maintained by a different entity, e.g., an entity providing an infrastructure-as-a-service ("IaaS") platform. The cloud application platform can handle provisioning of resources in the underlying cloud computing infrastructure as well as staging and launching of applications using the provisioned resources. Therefore, developers who use the cloud application platform need not spend time building or configuring the hardware of a cloud computing system. Rather, the developers can focus on the application development itself, and rely on the services provided by the cloud application platform to launch and manage instances of the application. After being launched, the application instances can be used by end users over a network, e.g., the Internet.

A deployment system can automate and simplify transforming a source code or binary code representation of an application into one or more launched instances of that application using IaaS resources. The application instances can then be accessed by end users. An example of a cloud application platform is a Pivotal Cloud Foundry® software product deployed on a set of cloud appliances. An example deployment system is a BOSH system that deploys and manages service instances on a cloud application platform.

Although cloud application platforms make it easier to deploy platform applications, some software platforms may not support all types of software workloads and/or may be more suitable for managing the execution of some types of software workloads, but not other types of software workloads.

SUMMARY

This specification describes methods, systems, and computer readable media that implement an integrated cloud system that enables a user to integrate software tasks executing on different, possibly heterogeneous, software platforms. An integrated cloud system maintains a first software platform and a different second software platform that are configured to communicate by a shared networking subsystem. The integrated cloud system receives a first request from a developer to deploy one or more instances of a first software task on the first software platform. The first software platform deploys the one or more instances of the first software tasks. Each instance of the first software task has one or more executable components. The integrated cloud system receives a request from the developer to deploy one or more instances of a second software task on the second software platform. The second software platform deploys the one or more instances of the second software task. Each instance of the second software task has one or more executable components. The integrated cloud system configures communications between the one or more instances of the first software task deployed on the first software platform and the one or more instances of the second software task deployed on the second software platform using the shared networking subsystem.

Particular embodiments of the subject matter described in this specification can be implemented to realize one or more of the following advantages. A single cloud computing system that deploys and manages the integration of software tasks on multiple different software platforms enables users to create, deploy, and manage complex applications that include components that are executed on different software platforms. The system can cause the appropriate platform to deploy the components without requiring extensive user configuration of the components for the different platforms. The cloud computing system can automatically configure and deploy the components on various different cloud environments operated by various different cloud providers in response to selection of a cloud environment without requiring the user to reconfigure the components for the selected cloud environment. This allows users to move software tasks between cloud environments quickly and without reconfiguring the software tasks.

The cloud computing system can also initiate and configure various integrated services for the components executing on the different software platforms, e.g., automatically as part of the deploying of the software tasks. This allows software tasks executing in one software platform to consume integrated services launched in a different software platform.

The system includes a shared networking subsystem that allows components to communicate between the different software platforms. By initiating and configuring a shared networking subsystem, the components can be deployed quicker, with less user input, and with fewer errors.

The system that deploys software tasks on multiple software platforms also allows users to monitor and manage the software tasks through a single interface, e.g., using a single user interface such as a command line interface (CLI) or a graphical user interface, rather than having or interact with multiple different software platforms that have different user interfaces, different log-ins, and different security procedures.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

This specification describes technologies for an integrated cloud system that allows users to integrate multiple software tasks deployed on multiple different software platforms.

Figure 1:
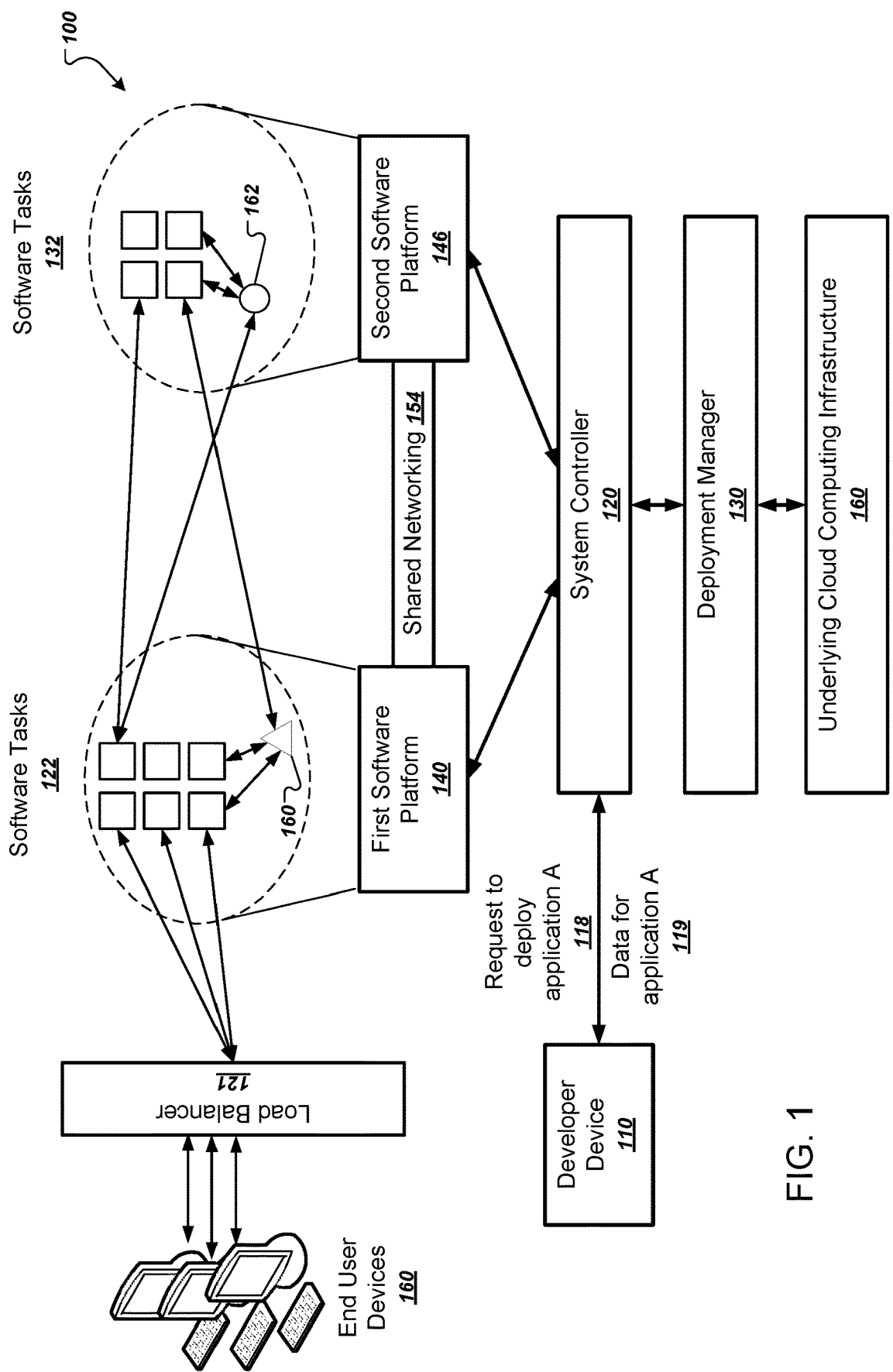
FIG. 1 illustrates an example integrated cloud system that provides for integration of software tasks launched on multiple different software platforms.

FIG. 1 illustrates an example integrated cloud system 100 that provides for integration of software tasks launched on multiple different software platforms. The software platforms include a first software platform 140 and a second software platform 146.

The entities involved in maintenance and operation of the integrated cloud system 100 can take on a variety of possibly overlapping roles. First, platform operators can install and maintain the first and second software platforms, e.g., using the deployment manager 130 to provision resources in the underlying cloud computing infrastructure.

Then, developers can provide software tasks to be launched on one or more of the software platforms 140 and 146. Additionally, end users are users who can access the launched software tasks executing on one of the software platforms 140 and 146.

For example, developers can launch software tasks 122 on the first software platform 140, which can then be accessed by one or more end users using end user devices 160. In order to determine which instance of a software task is selected to handle a request from an end user, the system can use a load balancer 121 that uses load balancing procedures to map incoming requests from end users to executing instances of software tasks launched in the first software platform 140. Although not illustrated in FIG. 1, the second software platform 146 can also use similar load balancing techniques to route end user requests to specific instances of software tasks launched on the second software platform 146.

To launch software tasks, developers can communicate with a system controller 120. The software controller 120 is a software system that coordinates the setup and management of software tasks on the platforms 140 and 146. To do so, the system controller 120 can use a deployment manager 130 to provision resources in an underlying cloud computing infrastructure 160. For example, the deployment manager 130 can be a BOSH-compliant deployment manager implemented using the open source BOSH project. In some implementations, the deployment manager 130 is configured to provision resources in a way that maintains hardware isolation between the different platforms in the integrated cloud system 100. In other words, the deployment manager 130 can provision computing resources so that software tasks executing on the first software platform 140 do not compete for hardware resources or other computing resources with software tasks executing on the second software platform 146.

The deployment manager 130 can deploy software tasks in multiple different underlying cloud environments provided by multiple cloud providers. Example cloud environments include VMWare Cloud Foundation, Google Cloud Platform (GCP) and Amazon Web Services (AWS) cloud. The cloud environment can also be a private cloud environment, such as a local on-premises computer network. The system controller 120 can allow the user to select the cloud environment for running a software task. The deployment manager 130 can, in turn, configure the software task, and deploy the software task on the appropriate platform in the selected cloud environment. In this way, the user can deploy an application on different cloud environments without having to reconfigure the software task or its components for each different underlying cloud computing environment.

Each of the software platforms 140 and 146 can support integrated services. A service is a software subsystem that can provide one or more functionalities for use by software tasks. An example of a service for use by a software task is a database management system that maintains a database that can be accessed and modified by a software task.

To provide an integrated service, each software platform can launch one or more service instances, which are software modules that implement the functionality of the service. For example, the first software platform 140 has a first service instance 160, and the second software platform has a second service instance 162.

Each software platform 140 and 146 can automatically provision resources for executing integrated service instances. This collection of resources may be referred to as a services back-end, which can either be pre-provisioned or provisioned on demand. Techniques for on-demand service provisioning are described in commonly-owned U.S. patent application Ser. No. 15/256,275, filed on Sep. 2, 2016, entitled, "On-Demand Resource Provisioning," which is herein incorporated by reference.

A service can be integrated into a cloud application platform by implementing a service application programming interface (API). One example of a service API is the Open Service Broker API. A service API can be used by a the system controller 120 to surface available services for selection by application developers. For example, the cloud application platform can present to developers a collection of available integrated services that can be used with their software tasks.

Such a collection of available integrated services that can be used by platform applications can also be referred to as a services marketplace. A services marketplace is thus a mechanism, an interface, or a tool of a software platform that allows developers to self-select services to be bound to software tasks executing on a software platform. A services marketplace does not necessarily imply a financial exchange, although some services marketplaces can require payment by developers in order for the developers to use a service with their platform software tasks. For example, the system controller 120 can provide a marketplace user interface that includes a list of managed services and enables a developer to select services to be launched on one or more of the software platforms 140 and 146.

Each software platform 140 and 146 can bind a service instance to a software task by providing to the software task the information necessary for the software task to use the service instance. This information typically includes at least a location or identifier of a service or an executing service instance, e.g., a network address, and may also include credentials required to access and use the service or service instance.

Thus, the first software platform 140 can bind the first service instance 160 to the software tasks 122 launched on the first software platform. Likewise, the second software platform 146 can bind the second service instance 162 to software tasks 132 launched on the second software platform.

The integrated system 100 also allows binding of services hosted on different software platforms. Thus, for example, as illustrated in FIG. 1, the first service instance 160 of the first software platform 140 can be bound to a software task 132 launched on the second software platform 146. Similarly, the second service instance 162 of the second software platform 146 can be bound to a software task 122 launched on the first software platform.

In order to do so, the platforms 140 and 146 can use service brokers. A service broker is a component or a module of a service the implements the service API. Service brokers can thus receive and interpret calls to create, update, and delete service instances, and create and delete service bindings. A service broker can be a separate module or another application running on one of the platforms.

Thus, in order to create cross-platform service functionality, a service broker on one of the platforms can implement an API that can be used by software tasks in either software platform. The service broker can then handle requests from software tasks in either platform to create, update, and delete service instances, and create and delete service bindings.

The system 100 can further improve the performance and scalability of the system by implementing a shared networking subsystem 154 that connects different components between the different platforms 140 and 146. The shared networking subsystem 154 implements a virtual network between the platforms 140 and 146 that allows components on one platform to discover and route traffic to components on a different platform. The virtual network can include virtual routers and switches, e.g., running on virtual machines or in containers, that enable data communication within each platform and between applications running in each platform. In some implementations, the networking services 154 assigns a network address to each application or each application component executing on the platforms and manages the data communications on the virtual network using the network addresses. In addition, the shared networking subsystem 154 can implement policies that determine whether a component on one platform is allowed to communicate with a component on a different platform.

Furthermore, the shared networking subsystem 154 can provide for lateral software task communications that prevents software tasks from having to generate north/south traffic out through the load balancer 121 and back. As illustrated in FIG. 1, a software task 122 on the first software platform 140 can communicate with the second service instance 162 on the second software platform 146 through a virtual network implemented by the shared networking subsystem 154. A service broker on the first software platform 140 can also handle a bind request for the software task 122 by communicating through the virtual network to discover available service instances on the second software platform 162. The service broker can then provide, to the software task 122, an address in the virtual network to communicate with the second service instance 162 on the second software platform 146. In addition to improving task-to-task performance, the shared networking subsystem 154 also alleviates strain on the load balancer 121, thereby further increasing the number of end users that can use the system 100.

The integration of the different software platforms also allows for easy manipulation of policies for task-to-task communications. For example, a developer using the developer device 110 can communicate with the system controller 120 to enable one task on the first software platform 140 to communicate with another task on the second software platform 146, e.g., by issuing a simple command on the command line. The system controller 120 can then effectuate the command by manipulating routing tables maintained by the shared networking subsystem 154 that control permissions of task-to-task communications.

The virtual network provided by the shared networking subsystem 154 also allows such policies to move with tasks when they crash and need to be restarted in different computing resources. For example, if a cloud application executing on the first software platform crashes and is restarted in a different container, the shared networking subsystem 154 can automatically update the routing rules to apply to the restarted application.

One example integration of two different software platforms is to use a cloud application platform with a container orchestration platform. An example of a container orchestration platform is Pivotal Container Service, which provides the functionality for launching Kubernetes clusters to run container workloads.

A cloud application platform is typically an environment designed for high-productivity software development. Therefore, much of the underlying configurations and dependencies are handled automatically, e.g., using frameworks and other integrated development tools, during staging and launching the applications.

On the other hand, container orchestration platforms can be better for hosting third-party, off-the-shelf software that may not have been written with the development environment of the cloud application platform in mind. Thus, it is possible to adapt third-party, off-the-shelf software for use on a cloud application platform, but doing so would typically require much more work and configuration tan simply launching the software in one or more container workloads of a container cluster running an already compatible operation system. An example container orchestration platform includes Kubernetes compliant clusters managed by a Kubernetes compliant container orchestrator. Kubernetes is a registered trademark of The Linux Foundation.

Some high-productivity software can be integrated with off-the-shelf software, e.g., to use some functionality of the off-the-shelf software. Absent the systems and techniques described herein, the two applications would be executed on the same platform, thus requiring one of the applications to be executed on its non-preferred platform. The system 100 enables both applications to be deployed in different environments and include shared networking, shared security, and other shared services, as described in more detail below. In addition, users can deploy both types of applications using a same system 100, allowing the users to monitor and interact with the different types of applications using a common interface or application.

The system 100 can also support a number of shared utilities that further bind together the different software platforms. These shared utilities include logging and metrics utilities and security utilities. The logging and metrics utilities can collect data from and/or about software tasks running on the software platforms 140 and 146. For example, the logging and metrics utilities can generate metrics, e.g., performance and health metrics, using the collected data, and generate user interfaces that present the metrics and/or collected data to platform operators, developers, or end users. For example, in this way, a platform operator can view the metrics related to software tasks running on both platforms at a common interface, providing a unified experience for the platform operator.

The logging and metrics utilities can include a health monitoring utility that monitors the health of each shared utility and/or the software tasks executing on the software platforms. For example, the health monitoring utility can install probes on the first software platform and the second software platform. The probes can collect health and performance data for the platforms and the software tasks deployed on the platforms and provide the data to the system controller 120 for transmission to the user device 110. The health monitoring service can also generate one or more user interfaces that present the health data. An example health monitoring utility is described in commonly-owned U.S. patent application Ser. No. 16/206,865, filed on Nov. 30, 2018, entitled, "Health Monitoring for Cloud Computing Platforms," which is herein incorporated by reference.

At least one of the user interfaces can provide a unified graphical user interface (GUI) that is configured to present a summary of the health of the software tasks and the shared utilities. For example, the unified GUI can present health information for the first software platform, the second software platform, and the software tasks executing on the platforms. The health data can include data related to the number of instances of each software task that is running, the amount of memory and data storage capacity being consumed by each software task, the amount of available memory and available storage capacity for each software task, the response time for each software task or service, whether the software task or service is running, and/or other appropriate health data. In this way, platform operator can view health information for software tasks running in multiple different software platforms and for services for the software tasks using a single interface rather than having to view interfaces provided by multiple software tasks or software platforms and/or navigating to multiple different interfaces.

The user interfaces can include data for multiple different software tasks running for a user or organization. For example, a platform operator can monitor the health of hundreds or thousands of software tasks running on multiple platforms by requesting and viewing user interfaces provided by the logging and metrics utilities.

The system 100 can also implement security utilities that provide shared security for the different software platforms 140 and 146. For example, the security utilities can provide data encryption services, user authentication services, and/or other appropriate security services for the different software platforms and the software tasks running on the platforms.

In some implementations, the security utilities implement the shared security based on a shared security policy configuration. The shared security policy configuration can include a centralized credential management system that has at least one policy server and one or more policy agents. Each policy agent can correspond to a respective policy server.

The shared security policy can include at least one system level security policy. Each system level security policy can specify rules of communication between software tasks deployed on the different software platforms 140 and 146.

The shared security policy can also include as least one user-level security policy. Each user level security policy can specify rules of communication between different components one of the software platforms. For example, the user level security policy can specify rules for communication between stand-alone executable components deployed on the first software platform 140 or the second software platform 146. Each user level security policy can be configured by a developer of the software tasks.

In sum, the integration of different platforms in the system 100 realizes many of the self-service goals of a cloud platforms. This means that developers can worry primarily about the operational aspects of their software tasks, while leaving the tedious configuration and resource provisioning to the automated mechanisms of the integrated system 100.

Figure 2:
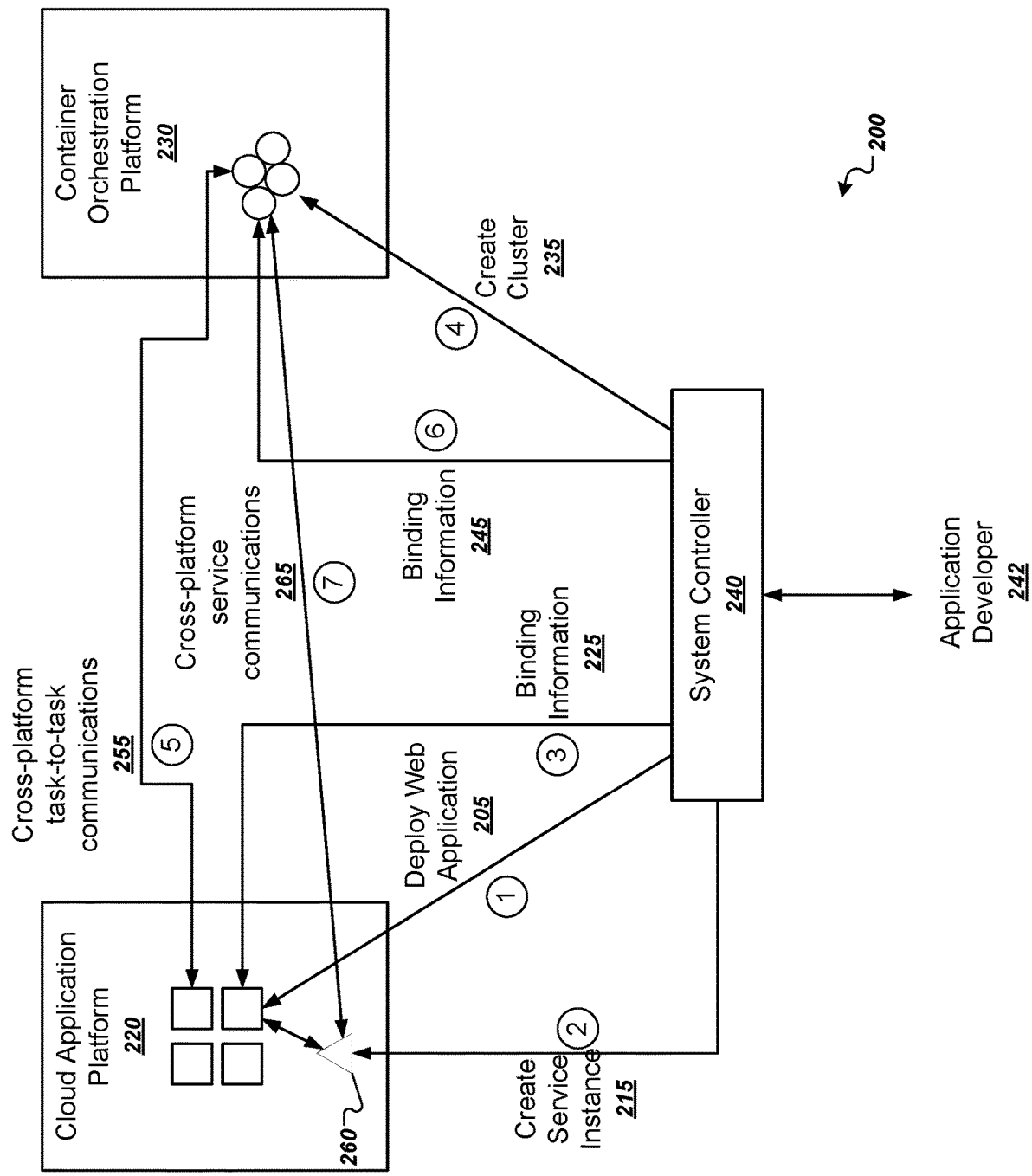
FIG. 2 illustrates an example of using an integrated cloud system to deploy software tasks on multiple different platforms.

FIG. 2 illustrates example of using an integrated cloud system to deploy software tasks on multiple different platforms will now be described. In this example, an application developer 242 launches a web application on a cloud application platform 220, a third-party monitoring service on the cloud application platform 220, and a third-party back-end database on a container orchestration platform 230. The integrated cloud system 200

An application developer 242 can provide the system controller 240 a cloud-based web application created by the application developer. The web application can use a third-party, off-the-shelf monitoring service to maintain usage statistics about the application A by end users. For example, the application A can include code that requests usage statistics data from the third-party monitoring service and provides updated usage data to the third-party monitoring service. This usage may also be referred to as a dependency of the web application on the monitoring service. The deployment manager of the system, e.g., the deployment manager 130, can use such dependency information when provisioning resources in the underlying cloud infrastructure.

The web application can also make use of a back-end database that will be launched on the container orchestration platform 230. For example, the web application can be an online movie database that maintains information about movies. The web application can use the back-end database to store information about movie attributes, e.g., actors, directors, and release dates, of movies.

As described above, the integrated cloud system allows software tasks in one platform to use services launched in a different platform. Thus, in this example, the back-end database launched on the container orchestration platform 230 can also use the monitoring service launched on the cloud application platform 220. For example, the back-end database can be configured to report usage statistics and performance metrics to the monitoring service.

Because the integrated cloud system 200 abstracts away all the complicated configuration and resource provisioning steps that are typically required to launch web applications, the application developer 242 can launch the example system by issuing just a handful of commands to the system controller 240.

For example, the application developer can submit, to the system controller 240, a request to deploy the web application on the cloud application platform 220. For example, the user can use a CLI or a GUI of a user device to submit the request to the system controller 240.

In response to the request, the system controller can provide a deploy web application command 205 to the cloud application platform 220. As part of this process, the system can use the deployment manager to provision resources for deploying one or more instances of the web application in the cloud application platform 220.

The application developer can also use the CLI and/or the GUI to select the monitoring service as one of the integrated services provided by the cloud application platform 220, e.g., using a services marketplace. This causes the system controller 240 to issue a create service instance command 215 to the cloud application platform 220. In response, the cloud application platform 220 can use on-demand resource provisioning to provision resources for the monitoring service 260.

After the monitoring service 260 is launched on the cloud application platform, the application developer can use a CLI and/or the GUI to bind the monitoring service to the web application. This process involves providing information to the web application instances that allows them to locate the service instances of the monitoring service 260.

In response, the system controller 240 provides binding information 225 to the launched instances of the web application in the cloud application platform 220.

The application developer can next issue a command to launch the back-end database on the container orchestration platform 230. As described above, container orchestration platforms may have certain advantages over cloud application platforms. As one example, container orchestration platforms tend to perform better for software tasks that maintain state and should be kept alive, e.g., a database. On the other hand, cloud application platforms excel at software tasks that do not maintain state, e.g., web applications that service incoming HTTP requests.

In response, the system controller 240 can issue a create cluster command 235 that directs the container orchestration platform 230 to provision resources for a container cluster having a master node that coordinates multiple worker nodes that each maintain an instance of the back-end database.

The instances of the web application launched on the cloud application platform 220 can then begin cross-platform task-to-task communications 255 in order to query the back-end database launched in the container orchestration platform 230. As described above, this process of cross-platform task-to-task communications can use references to component names in a virtual network that is maintained by a shared networking subsystem. In addition, the cross-platform task-to-task communications can be lateral communications that do not travel back out through a load balancer of either of the software platforms or of the integrated cloud service itself.

The application developer 242 can also issue a command to bind the monitoring service 260 on the cloud application platform 220 to the container cluster launched on the container orchestration platform 230. In response, the system controller 240 can provide binding information 245 to the launched container cluster that allows the nodes of the container cluster to locate and communicate with the service instances of the monitoring service 260. As described above, this process of cross-platform binding commands can refer to component names in a virtual network that is maintained by the shared networking subsystem.

The back-end database launched in the container orchestration platform 230 can then begin providing usage statistics to the monitoring service 260 using cross-platform service communications 265. As described above, the cross-platform service communications 265 can be lateral task-to-instance communications that do not travel back out through a load balancer of either of the software platforms or of the integrated cloud service itself.

In some implementations, the application developer can designate which components are to execute on which platforms. For example, the application developer can provide to the system controller 120 stand-alone executable components that will be executed on the cloud application platform. Similarly, the application developer can provide to the system controller 120 precompiled container workloads.

After being deployed, the application developer 242 can obtain usage statistics by communicating with the monitoring service 260. The system controller 240 can also provide its own integrated metrics for the web application, the monitoring service, and the back-end database for presentation to the application developer. The data can include performance metrics, application health data, other metrics, user interfaces that include the metrics, and/or other appropriate data. For example, as described above, the logging and metrics utility can collect and store data related to the web application and its components. The logging and metrics utility can also compute the metrics and generate user interfaces that present the data and metrics. The user interfaces can includes a unified GUI configured to present a summary of the health of the service instances of the monitoring service 260. The system controller 240 can obtain the data from the logging and metrics utility and provide the data to the application developer 242.

Figure 3:
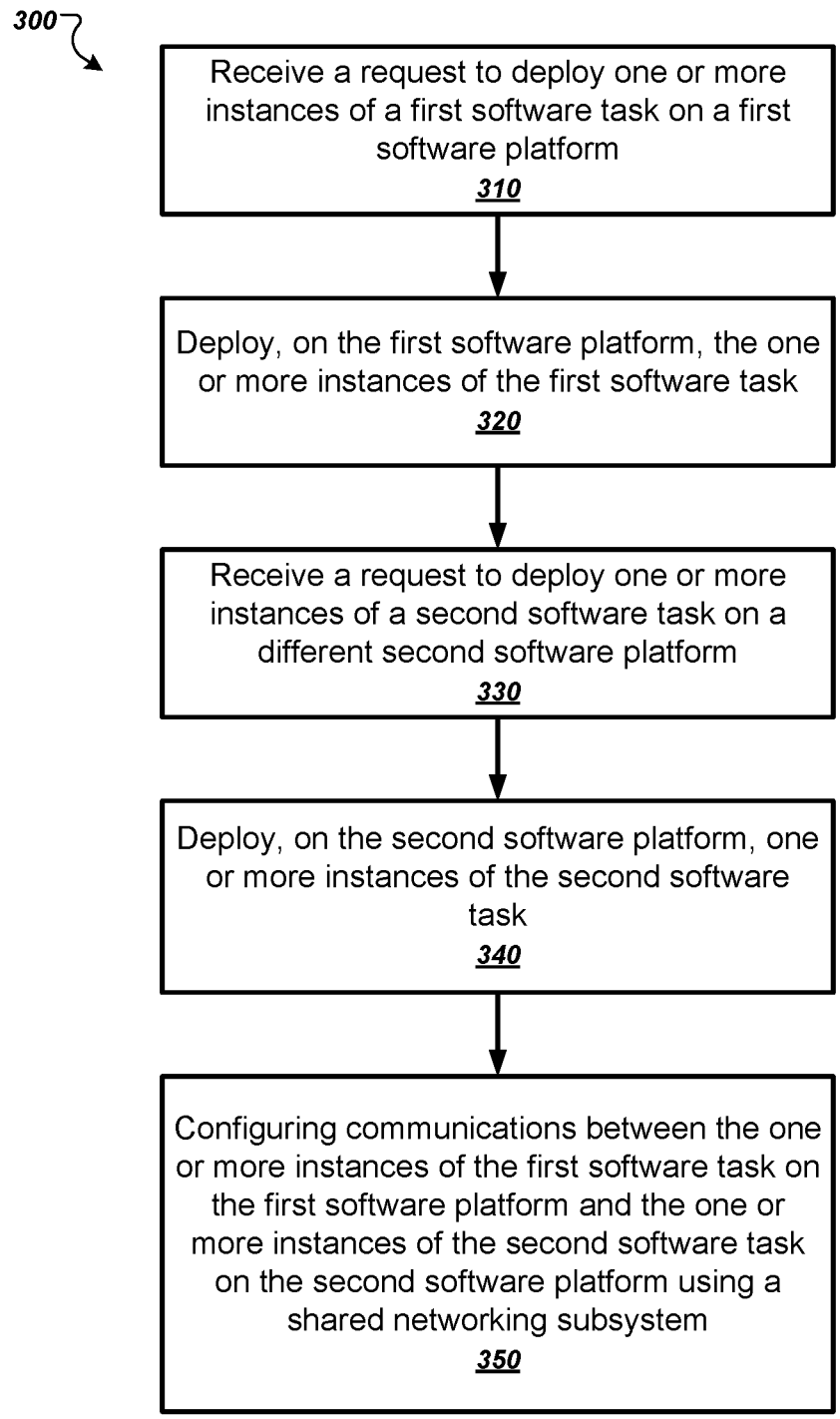
FIG. 3 is a flow chart of an example process for deploying software tasks on multiple different software platforms in an integrated cloud system.

FIG. 3 is a flow chart of an example process 300 for deploying software tasks on multiple different software platforms in an integrated cloud system. For convenience, the process 300 will be described as being performed by a distributed system having a plurality of computers in an underlying cloud computing system and programmed appropriately in accordance with this specification. For example, the integrated cloud system 100 of FIG. 1, appropriately programmed can perform the example process 300.

The system receives a request to deploy a one or more instances of a first software task on a first software platform (310). For example, a developer can submit a request to deploy a first software task using a CLI or GUI of a system controller. The request can identify the software task in addition to a number of instances of the software task to be deployed.

The software task can include one or more stand-alone executable components to be executed on a cloud application platform. The first software task can also include one or more containerized executable components that are executed on a container orchestration platform. Each containerized executable component can include a respective software task that executes in a respective dedicated user space, e.g., in a dedicated container of a Kubernetes cluster.

The request can specify the location of source code or executable components that implement the first software task. The first software task may also have one or more dependencies on integrated services, e.g., one or more off-the-shelf services, e.g., third party services.

The system deploys, on the first software platform, the one or more instances of the first software task (320). For example, the deployment can be performed by a first software platform that includes an application service that deploys cloud applications on a cloud application platform, e.g., in response to a request from a deployment manager. For example, the application service can be a Pivotal Application Service compliant application service. The application service can deploy the one or more stand-alone executable components of the cloud-based application program. If the first software task also has dependencies on one or more integrated services, the system can also provision resources for services instances that implement the integrated services.

The system receives a request to deploy one or more instances of a second software task on a different second software platform (330). For example, a developer can provide a request to launch instances of a second software task for a different second software platform. As described above, the second software platform is separate from the first software platform, and software tasks executing in the second software platform can have complete hardware isolation from software tasks executing in the first software platform. The different software platforms can have the same or different types. For example, both can be cloud application platforms, both can be container orchestration platforms, or the system can have one or more of each. In addition, an integrated cloud system can maintain more than two separate software platforms.

The system deploys, on the second software platform, one or more instances of the second software task (340). For example, the second software platform can include a container service that deploys software tasks on a container orchestration platform, e.g., in response to a request from a deployment manager. For example, the container service can be a Pivotal Container Service (PKS) compliant service that deploys applications in Kubernetes clusters. The container service can deploy the one or more containerized executable components.

The system configures communications between the one or more instances of the first software task on the first software platform and the one or more instances of the second software task on the second software platform using a shared networking subsystem (350). As described above, the shared networking subsystem allows the different software tasks executing in the different software platforms to communicate and controls policies regarding such communications. This effectively allows the first software task and the second software task to serve one another as internal or external services.

The system can also configure communication between the software tasks and service instances of integrated services. For example, a developer can provide a request to bind one or more integrated services on the first software platform to instances of a second task on the second software platform. The developer can select the services from a service marketplace on either of the software platforms.

The system can also configure other shared utilities to further coordinate the integration of the different software platforms. As described above, the shared utilities can include database services, security services, e.g., encryption and identity services, messaging services, mobile services, and/or other appropriate services.

Each of the software platforms can be configured to execute in one or more cloud environments provided by one or more cloud providers. In some implementations, the developer can select a cloud environment and the system can deploy the components of the software platforms in the selected cloud environment.

In some implementations, the shared networking subsystem implements a virtual network having common virtualization. For example, the system can setup and configure a virtual network with virtual network switches and virtual network routers that enable the services to communicate with one another. The system can assign to each component of the tasks executing on the platforms a respective network address that enables the components to communicate with one another over the virtual network.

The different software platforms can also share security services. For example, each service can share a same security policy configuration. As described above, the shared security policy configuration can include a centralized credential management system that has at least one policy server and one or more policy agents, and each policy agent can correspond to a respective policy server. For example, the credential management system can manage the permissions of users, e.g., platform operators, attempting to interact with a cloud application and/or request data related to the cloud application, e.g., health and performance data for the cloud application.

The system can also provide data regarding each of the components of the integrated cloud service back to the developer in one or more user interfaces. For example, at least one user interface can provide a unified GUI that is configured to present a summary of the health of the components of the platforms, as described above, to allow the developer to monitor the health of tasks running on the multiple different software platforms.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communications network. Examples of communications networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

In addition to the embodiments described above, the following embodiments are also innovative:

Embodiment 1 is a method comprising:
maintaining, by an integrated cloud system, a first software platform and a different second software platform that are configured to communicate by a shared networking subsystem;
receiving, by the integrated cloud system, a first request from a developer to deploy one or more instances of a first software task on the first software platform;
deploying, by the first software platform, the one or more instances of the first software tasks, each instance of the first software task having one or more executable components;
receiving, by the integrated cloud system, a request from the developer to deploy one or more instances of a second software task on the second software platform;
deploying, by the second software platform, the one or more instances of the second software task, each instance of the second software task having one or more executable components; and
configuring, by the integrated cloud system, communications between the one or more instances of the first software task deployed on the first software platform and the one or more instances of the second software task deployed on the second software platform using the shared networking subsystem.

Embodiment 2 is the method of embodiment 1, wherein the first software platform is a cloud application platform configured to launch cloud applications, and wherein the second software platform is a container orchestration platform configured to launch clusters of container workloads.

Embodiment 3 is the method of embodiment 1, wherein the first software task and the second software task are configured to serve one another as internal or external services.

Embodiment 4 is the method of embodiment 1, wherein the one or more instances of the first software task are accessible by one or more end users over a network.

Embodiment 5 is the method of embodiment 1, further comprising:
receiving, by the integrated cloud system, a request from a developer to launch a service in the first software platform or the second software platform; and
in response, provisioning resources for one or more service instances to implement the requested service in the selected software platform.

Embodiment 6 is the method of embodiment 5, further comprising:
receiving, by the integrated cloud system, a request from the developer to bind the service to the one or more instances of the first software task in the first software platform; and
providing, by the integrated cloud system to the one or more instances of the first software task, binding information for the service.

Embodiment 7 is the method of embodiment 6, further comprising:
receiving, by the integrated cloud system, a request from the developer to bind the service to the one or more instances of the second software task in the second software platform; and
providing, by the integrated cloud system to the one or more instances of the second software task, binding information for the service.

Embodiment 8 is the method of embodiment 7, wherein both the first software tasks in the first software platform and the second software tasks in the different second software platform use the service.

Embodiment 9 is the method of embodiment 8, wherein the service instances that implement the service are deployed in the first software platform or the second software platform.

Embodiment 10 is the method of embodiment 9, wherein the service instances that implement the service are deployed in only one of the first software platform or the second software platform.

Embodiment 11 is the method of embodiment 1, wherein deploying the one or more instances of the first software task is performed at least in part by a BOSH-compliant deployment manager, and deploying the one or more instances of the second software task is performed at least in part by a Kubernetes-compliant container orchestrator.

Embodiment 12 is the method of embodiment 1, wherein the shared networking subsystem includes at least one virtual network switch and one or more virtual network routers.

Embodiment 13 is the method of embodiment 1, wherein the one or more instances of the first software task have hardware isolation from the one or more instances of the second software task.

Embodiment 14 is the method of embodiment 1, wherein the first software task and the second software task communicate with one another through a network having common virtualization, over a shared security policy configuration.

Embodiment 15 is the method of embodiment 14, wherein the shared security policy configuration includes a centralized credential management system having at least one policy server and one or more policy agents, each policy agent corresponding to a respective server.

Embodiment 16 is the method of embodiment 14, wherein the shared security policy configuration includes at least one system level security policy configured by an administrator of the integrated cloud system, the system level security policy specifying rules of communication between services and between virtual machines.

Embodiment 17 is the method of embodiment 14, wherein the shared security policy configuration includes at least one user level security policy configured by a developer of the first software task, the user level security policy specifying rules of communication between components executing in the first software platform.

Embodiment 18 is the method of embodiment 1, wherein an underlying cloud computing infrastructure of the integrated cloud system is a private cloud computing environment.

Embodiment 19 is the method of embodiment 1, wherein an underlying cloud computing infrastructure of the integrated cloud system includes a plurality of cloud computing environments provided by a plurality of different cloud providers.

Embodiment 20 is the method of embodiment 1, wherein the integrated cloud service includes a health monitoring service configured to monitor health of each of a plurality of services and to provide a unified graphical user interface configured to present a summary of the health of the plurality of services.

Embodiment 21 is a system comprising: a plurality of computers and one or more storage devices storing instructions that are operable, when executed by the one or more computers, to cause the one or more computers to perform the method of any one of embodiments 1-20.

Embodiment 22 is a computer storage medium encoded with a computer program, the program comprising instructions that are operable, when executed by a plurality of computers, to cause the plurality of computers to perform the method of any one of embodiments 1-20.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A method performed by a distributed computing system comprising a plurality of computers, the method comprising:

maintaining, by an integrated cloud system, a first software platform and a different second software platform that are configured to communicate by a shared networking subsystem, wherein:

the first software platform is configured to:

(i) provision, using a deployment manager of the integrated cloud system, first underlying cloud computing resources of a first cloud computing infrastructure for a first type of software tasks deployed in the first software platform and (ii) launch the first type of software tasks using the provisioned first underlying cloud computing resources;

the second software platform is configured to:

(i) provision, using the deployment manager, second underlying cloud computing resources of a second cloud computing infrastructure for a second type of software tasks, different from the first type of software tasks, deployed in the second software platform and (ii) launch the second type of software tasks using the provisioned second underlying cloud computing resources, wherein the second software platform is not configured to launch the first type of software tasks; and tasks of the first software platform have hardware isolation from tasks of the second software platform;

receiving, by the integrated cloud system, a first request from a developer to deploy one or more instances of a first software task of an application on the first software platform, wherein the first software task is of the first type of software tasks;

deploying, by the first software platform, the one or more instances of the first software tasks, each instance of the first software task having one or more executable components;

receiving, by the integrated cloud system, a request from the developer to deploy one or more instances of a second software task of the application on the second software platform, wherein the second software task is of the second type of software tasks;

deploying, by the second software platform, the one or more instances of the second software task, each instance of the second software task having one or more executable components; and configuring, by the integrated cloud system, communications between the one or more instances of the first software task deployed on the first software platform and the one or more instances of the second software task deployed on the second software platform using the shared networking subsystem.

2. The method of claim 1, wherein the first software platform is a cloud application platform configured to launch cloud applications, and wherein the second software platform is a container orchestration platform configured to launch clusters of container workloads.

3. The method of claim 1, wherein the first software task and the second software task are configured to serve one another as internal or external services.

4. The method of claim 1, wherein the one or more instances of the first software task are accessible by one or more end users over a network.

5. The method of claim 1, further comprising:
receiving, by the integrated cloud system, a request from a developer to launch a service in the first software platform or the second software platform; and
in response, provisioning resources for one or more service instances to implement the service in the first software platform or the second software platform.

6. The method of claim 5, further comprising:
receiving, by the integrated cloud system, a request from the developer to bind the service to the one or more instances of the first software task in the first software platform; and
providing, by the integrated cloud system to the one or more instances of the first software task, binding information for the service.

7. The method of claim 6, further comprising:
receiving, by the integrated cloud system, a request from the developer to bind the service to the one or more instances of the second software task in the second software platform; and
providing, by the integrated cloud system to the one or more instances of the second software task, binding information for the service.

8. The method of claim 7, wherein both the first software tasks in the first software platform and the second software tasks in the different second software platform use the service.

9. The method of claim 8, wherein the service instances that implement the service are deployed in the first software platform or the second software platform.

10. The method of claim 9, wherein the service instances that implement the service are deployed in only one of the first software platform or the second software platform.

11. The method of claim 1, wherein deploying the one or more instances of the first software task is performed at least in part by a BOSH-compliant deployment manager, and deploying the one or more instances of the second software task is performed at least in part by a Kubernetes-compliant container orchestrator.

12. The method of claim 1, wherein the shared networking subsystem includes at least one virtual network switch and one or more virtual network routers.

13. The method of claim 1, wherein the first software task and the second software task communicate with one another through a network having common virtualization, over a shared security policy configuration.

14. The method of claim 13, wherein the shared security policy configuration includes a centralized credential management system having at least one policy server and one or more policy agents, each policy agent corresponding to a respective server.

15. The method of claim 13, wherein the shared security policy configuration includes at least one system level security policy configured by an administrator of the integrated cloud system, the system level security policy specifying rules of communication between services and between virtual machines.

16. The method of claim 13, wherein the shared security policy configuration includes at least one user level security policy configured by a developer of the first software task, the user level security policy specifying rules of communication between components executing in the first software platform.

17. The method of claim 1, wherein an underlying cloud computing infrastructure of the integrated cloud system is a private cloud computing environment.

18. The method of claim 1, wherein an underlying cloud computing infrastructure of the integrated cloud system includes a plurality of cloud computing environments provided by a plurality of different cloud providers.

19. The method of claim 1, wherein the integrated cloud system includes a health monitoring service configured to monitor health of each of a plurality of services and to provide a unified graphical user interface configured to present a summary of the health of the plurality of services.

20. A distributed computing system comprising a plurality of computers and one or more storage devices storing instructions that are operable, when executed by the plurality of computers, to cause the plurality of computers to perform operations comprising:
maintaining, by an integrated cloud system, a first software platform and a different second software platform that are configured to communicate by a shared networking subsystem, wherein:
the first software platform is configured to:
(i) provision, using a deployment manager of the integrated cloud system, first underlying cloud computing resources of a first cloud computing infrastructure for a first type of software tasks deployed in the first software platform and (ii) launch the first type of software tasks using the provisioned first underlying cloud computing resources;

the second software platform is configured to:
(i) provision, using the deployment manager, second underlying cloud computing resources of a second cloud computing infrastructure for a second type of software tasks, different from the first type of software tasks, deployed in the second software platform and
(ii) launch the second type of software tasks using the provisioned second underlying cloud computing resources, wherein the second software platform is not configured to launch the first type of software tasks; and tasks of the first software platform have hardware isolation from tasks of the second software platform;

receiving, by the integrated cloud system, a first request from a developer to deploy one or more instances of a first software task of an application on the first software platform, wherein the first software task is of the first type of software tasks;

deploying, by the first software platform, the one or more instances of the first software tasks, each instance of the first software task having one or more executable components;

receiving, by the integrated cloud system, a request from the developer to deploy one or more instances of a second software task of the application on the second software platform, wherein the second software task is of the second type of software tasks;

deploying, by the second software platform, the one or more instances of the second software task, each instance of the second software task having one or more executable components; and configuring, by the integrated cloud system, communications between the one or more instances of the first software task deployed on the first software platform and the one or more instances of the second software task deployed on the second software platform using the shared networking subsystem.

21. One or more non-transitory computer storage media encoded with computer program instructions that when executed by a distributed system comprising a plurality of computers cause the plurality of computers to perform operations comprising:

maintaining, by an integrated cloud system, a first software platform and a different second software platform that are configured to communicate by a shared networking subsystem, wherein:

the first software platform is configured to:
(i) provision, using a deployment manager of the integrated cloud system, first underlying cloud computing resources of a first cloud computing infrastructure for a first type of software tasks deployed in the first software platform and
(ii) launch the first type of software tasks using the provisioned first underlying cloud computing resources;

the second software platform is configured to:
(i) provision, using the deployment manager, second underlying cloud computing resources of a second cloud computing infrastructure for a second type of software tasks, different from the first type of software tasks, deployed in the second software platform and
(ii) launch the second type of software tasks using the provisioned second underlying cloud computing resources, wherein the second software platform is not configured to launch the first type of software tasks; and tasks of the first software platform have hardware isolation from tasks of the second software platform;

receiving, by the integrated cloud system, a first request from a developer to deploy one or more instances of a first software task of an application on the first software platform, wherein the first software task is of the first type of software tasks;

deploying, by the first software platform, the one or more instances of the first software tasks, each instance of the first software task having one or more executable components;

receiving, by the integrated cloud system, a request from the developer to deploy one or more instances of a second software task of the application on the second software platform, wherein the second software task is of the second type of software tasks;

deploying, by the second software platform, the one or more instances of the second software task, each instance of the second software task having one or more executable components; and configuring, by the integrated cloud system, communications between the one or more instances of the first software task deployed on the first software platform and the one or more instances of the second software task deployed on the second software platform using the shared networking subsystem.

* * * * *